United States Patent [19]

Tremblay et al.

[11] 4,155,418

[45] May 22, 1979

[54] SNOWMOBILE ENGINE SAFETY CUT OUT SYSTEM

[75] Inventors: Georges Tremblay, Sherbrooke; Jerome Bomardier, Valcourt, both of Canada

[73] Assignee: Bombardier Limited, Valcourt, Canada

[21] Appl. No.: 803,247

[22] Filed: Jun. 3, 1977

[30] Foreign Application Priority Data

Jun. 3, 1976 [CA] Canada .................................. 254031

[51] Int. Cl.² ............................................. B60K 28/00
[52] U.S. Cl. ........................... 180/103 BF; 180/82 R; 123/198 DB
[58] Field of Search ............. 180/103 R, 103 BF, 104, 180/82 R, 5 R; 123/198 D, 198 DB, 198 DC; 200/61.85, 61.86

[56] References Cited

U.S. PATENT DOCUMENTS

| 3,116,729 | 1/1964 | Crowe | 123/198 DC X |
| 3,620,324 | 11/1971 | Smitley | 180/103 BF |
| 3,695,379 | 10/1972 | Veilleux | 123/198 D X |
| 3,722,492 | 3/1973 | Shibata | 123/198 DB |
| 3,772,643 | 11/1973 | Dodd | 180/104 |
| 3,789,938 | 2/1974 | Hetteen | 123/198 DB X |
| 3,798,402 | 3/1974 | Raab | 123/198 DC |
| 3,863,618 | 2/1975 | Scholz | 123/198 D |
| 3,881,461 | 5/1975 | Filip | 123/198 D |
| 3,898,973 | 8/1975 | Vidberg | 180/82 R X |

Primary Examiner—Joseph F. Peters, Jr.
Assistant Examiner—Terrance L. Siemens
Attorney, Agent, or Firm—Smart & Biggar

[57] ABSTRACT

A safety control system for a snowmobile engine provides a switch which senses the position of the carburetor control element, and a second switch which responds to the presence of the operator's hand on the throttle lever. The switches operate to short-circuit the ignition coil of the engine in the event of a malfunction so that, if the carburetor throttle remains stuck open after the pressure on the throttle lever has been momentarily released, the engine will be killed.

5 Claims, 5 Drawing Figures

SNOWMOBILE ENGINE SAFETY CUT OUT SYSTEM

BACKGROUND OF THE INVENTION (1) Field of the Invention

This invention relates to improvements in vehicle safety systems, and in particular to a system for use in a vehicle such as a snowmobile, which is effective to prevent or terminate operation of the engine upon malfunction of the control elements of the engine.

(2) Description of the Prior Art

Because of the adverse climatic conditions in which they frequently operate, small recreational vehicles such as snowmobiles can sometimes be subject to serious malfunction of the engine control elements. For example in snowmobiles the engine speed is usually controlled by a throttle lever mounted on the handlebar and connected to a carburetor control valve or piston through a bowden cable. The quantity of fuel/air mixture delivered to the engine, and consequently the engine speed, is governed by the carburetor valve or piston in response to movements of the throttle lever, spring means being provided to restore the carburetor valve or piston to an idle position when the lever is released. In certain climatic conditions such systems can fail, due to freezing of the carburetor valve or piston, the cable, or the throttle lever itself, resulting in a stuck throttle condition. When this condition arises, the engine may continue to operate at high speed even after the throttle lever has been released. To counteract this problem, present day snowmobiles commonly are equipped with a key and with a "kill switch" which is located close to the throttle lever and distinguished by color coding. Both of these devices can be activated in a stuck throttle situation to short circuit the engine ignition system and thus terminate operation of the engine.

However, while both these devices can be of assistance, operators often do not read the owner's manual and do not become familiar with the operation of these devices. Thus in a crisis situation, the operator sometimes panics and fails to activate the kill switch or the key.

Also of concern is the situation in which the engine has a stuck throttle condition when the operator attempts to start the engine. Snow-mobiles normally have automatic centrifugally operated clutches in a belt transmission between the engine and the driving track. Such clutches respond solely to engine speed, being disengaged at idle speed, but automatically forming a driving connection between the engine and the track as the engine speed increases. If the snowmobile engine is started when the throttle is stuck wide open, the engine speed will within a few seconds reach an RPM which will automatically engage the clutch and set the vehicle in motion. Thus the vehicle can start to move very quickly immediately upon starting of the engine. Although this situation can be easily prevented by checking for the free movement of the throttle control system before starting the vehicle and most present day snowmobiles do not require that the throttle be applied to start the vehicle, operators sometimes disregard these instructions and when a crisis occurs panic and fail to activate the kill switch or the key.

It is the object of this invention to alleviate problems arising through malfunction of the control elements of vehicle engines particularly, although not exclusively, in snowmobiles and to minimize the need for active response by the operator to correct the situation.

SUMMARY OF THE INVENTION

The present invention provides an a vehicle having an engine, a carburetor, a control element within said carburetor movable to adjust the quantity of fuel/air mixture supplied to said engine, a throttle actuator situated remote from said engine and adapted to be engaged by a person operating the machine, means interconnecting said control element to move in response to movements of the actuator, said throttle actuator being movable from a limiting position, corresponding to an idle position of said control element wherein the quantity of air/fuel mixture supplied to the engine is sufficient to maintain operation of the engine at only an idle speed, to positions wherein progressively greater quantities of fuel/air mixture can be supplied to the engine, the improvement comprising: first sensing means responsive to engagement of said throttle actuator by the operator, and second sensing means directly responsive to the position of said carburetor control element, and engine control means associated with said first and second sensing means, said engine control means being effective to prevent starting of said engine when the throttle actuator is disengaged unless said carburetor control element is in said limiting position, and effective to terminate operation of said engine if said carburetor control element remains displaced from said limiting position when said throttle actuator is released.

In normal operation of a vehicle such as a snowmobile, even where the control elements are all functioning properly, if the operator wishes to reduce the speed of the vehicle he will usually release the throttle actuator. However there will be a finite delay between release of the throttle actuator and return of the carburetor control element to the idle position, and to prevent undesired termination of the engine operation in this normal situation, it is desirable to include in the control system a time delay element to prevent termination of engine operation if the carburetor control returns to the idle position within a predetermined interval of time.

The sensing means which respond to engagement of the throttle actuator by the operator and to the position of the carburetor control element, preferably comprise switches which are connected in series, and which in a malfunction situation actuate a relay which operates a switch to disable the ignition system of the engine. The relay is preferably of such a type that it requires a resetting operation, which may be automatic or manual or both, so that the engine cannot be restarted until the relay has been reset. This prevents the operator from reactivating the system if he replaces his hand upon the actuator in a panic situation.

BRIEF DESCRIPTION OF THE DRAWINGS

The invention will further be described, by way of example, with reference to the accompanying drawings wherein:-

DESCRIPTION OF THE PREFERRED EMBODIMENT

Figure 1:
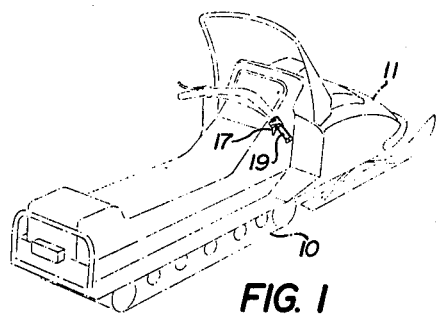
FIG. 1 is a somewhat schematic view of a snowmobile.

The snowmobile shown in FIG. 1 has a ground-engaging driving track 10, powered by an engine within the cab 11, at the front of the snowmobile. Fuel/air mixture is delivered to the engine through a carburetor 12 of known type shown in FIG. 2. The fuel/air mixture is delivered through a passage 13 in the carburetor, the effective area of the passage, and hence the rate of supply of the fuel/air mixture to the engine, being controlled by a sliding piston 14 which moves transversely of the passage 13 from a cylindrical housing 15. A coil spring 16 acts between the piston and the housing 15 to urge the piston to the position shown in FIG. 2 wherein it substantially blocks the passage 13 and thus restricting the fuel air mixture supply to the engine to a value sufficient to maintain only an idle engine speed.

Figure 2:
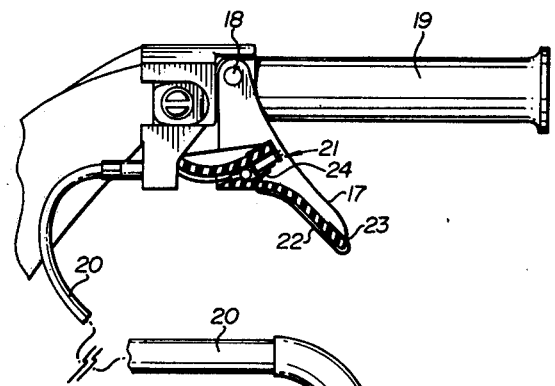
FIG. 2 is an enlarged parly sectioned view of a snowmobile carburetor and throttle control mechanism.
Figure 2:
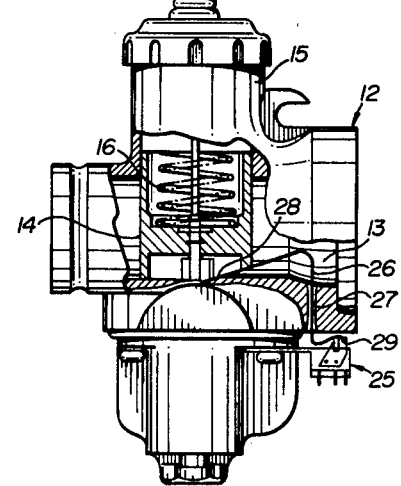

A throttle actuator in the form of a control lever 17 is pivotally mounted at 18 adjacent the right hand grip 19 of the snowmobile handle-bar, in a position where it may be readily manipulated by the thumb of the operator's right hand. A Bowden cable 20 is arranged with one end connected to the piston 14 and its opposite end connected as shown to the throttle lever 17, and acts upon pivotal movement of the lever 17 (counter-clockwise as seen in FIG. 2) to move the piston 14 against the force of the spring 16 and thus open the passage 13.

Sensing means in the form of a switch 21 is provided on the throttle lever 17. This switch is pressure sensitive, and is designed to sense whether or not the throttle lever 17 is engaged by the operator. As shown, the switch includes an actuator element 22 in the form of a large-area flexible strip which covers substantially the entire active face of the lever 27. One end 23 of the strip 22 is connected to the lever 17, and the other end 24 extends freely through an aperture in the lever 17 and is connected to the switch.

A second sensing means is provided in the form of a switch 25 mounted adjacent the carburetor and having an actuator element 26 to sense the position of the carburetor piston 14. The actuator element 26 is in the form of a light metal wire which extends through a passage 27 in the carburetor wall and has one end 28 positioned to be engaged by the piston 14 when the latter is in the idle position (as shown in FIG. 2) and another end 29 connected to the switch 25. Movement of the piston 14 to or from the idle position thus alters the condition of the switch 25.

Figure 3:
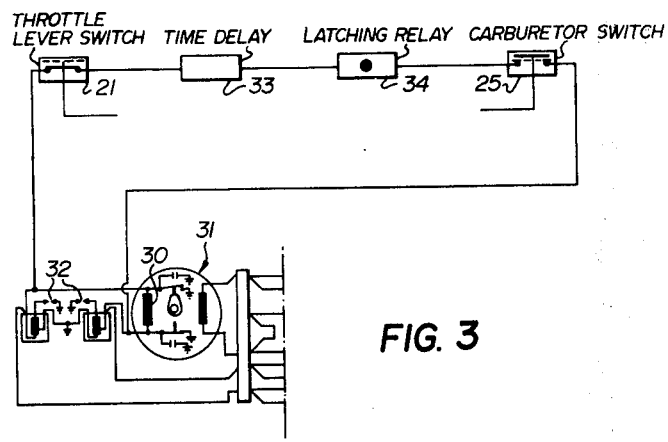
FIG. 3 is a schematic view of the engine control system.

FIG. 3 illustrates schematically how the throttle lever switch 21 and the carburetor switch 25 are connected to terminate operation of the engine when a malfunction condition arises. The switches are connected in series across the ignition coil 30 of a magneto 31 which functions in a well known manner to generate electrical energy for operation of the engine cylinder spark plugs which are indicated at 32. The throttle lever switch 21 is "normally closed", i.e. is closed except when the actuator element is engaged by the driver's hand. The carburetor switch 25 is open when the piston 14 is in the idle position, and is closed when the piston moves away from the idle position. Thus as long as one or other of the switches 21 and 25 is open, the ignition coil 30 can function to supply spark energy to the spark plugs 32. However when both the throttle switch 21 and the carburetor switch 25 are closed, a short-circuit is created across the ignition coil 30, so that if the engine is running, its operation is terminated, and if it is not running, it cannot be started.

Thus when the engine is running at idle speed the carburetor switch 25 is open, and the ignition coil 30 continues to deliver power to the spark plugs 32. During acceleration or normal operation of the vehicle the throttle lever switch 21 is held open by the operator's hand engaging the actuator element 22, and thus while the carburetor switch is closed, the ignition coil 30 is not short-circuited, and the engine continues to operate.

Should the situation arise that the throttle sticks open, i.e. the piston 14 fails to return to the idle position upon release of the throttle lever 17, then the throttle lever switch 21 and the carburetor switch 25 will both be closed thus short-circuiting the ignition coil 30 and terminating operation of the engine. By providing the actuator element 26 of the carburetor switch 25 actually within the passage 13, it can be assured that this switch responds directly to the position of the carburetor piston 14, and therefore produces a reliable response to terminate engine operation when a malfunction occurs.

It will be appreciated that even where no malfunction is present, a finite time interval will be required for the piston 14 to return from its fully open position to the idle position upon release of the throttle lever 17, and to prevent stopping of the engine in this situation, a time delay element 33 is provided and functions to prevent short-circuiting of the ignition coil 30 so long as the carburetor piston 14 is returned to the idle position within a predetermined time after the throttle lever 17 has been released. In addition a bi-stable latching relay 34 is provided which functions in combination with the time delay to prevent the operator from overriding the system by replacing his hand on the throttle lever and actuator sensing element after initial removal of his hand has activated the system, while nonetheless permitting use of a time delay to overcome problems of engine malfunctions which would otherwise occur, without loss of effectiveness or reaction time of the system. The mode of operation of the switches 21 and 25 in controlling the engine are summarized in the following table.

| | OPERATING MODE TABLE | | |
|---|---|---|---|
| MODE | THROTTLE LEVER SWITCH STATE | CARBURETOR SWITCH STATE | RESULT |
| IDLE | CLOSED | OPEN | ENGINE RUNNING |
| ACCELERATION | OPEN | CLOSED | ENGINE RUNNING |
| THROTTLE MALFUNCTION (STUCK OPEN) | CLOSED | CLOSED | ENGINE KILLED |

Figure 4:
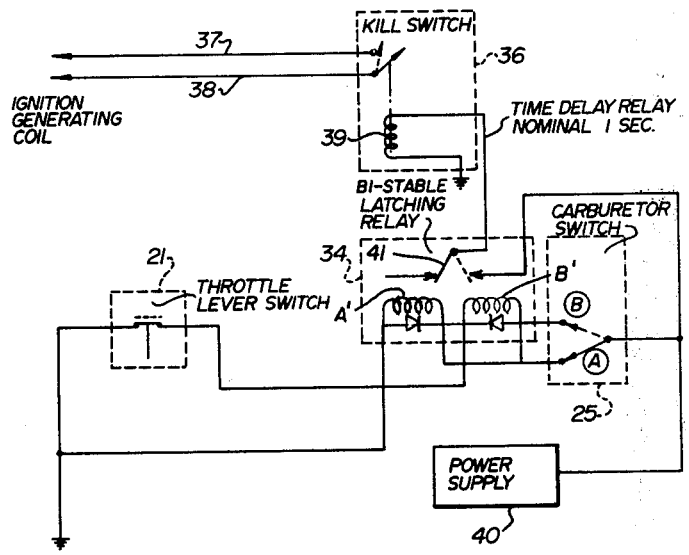
FIG. 4 is a circuit diagram showing the arrangement of certain elements in this system shown in FIG. 3.

FIG. 4 shows circuit details of a practical system embodying a throttle lever switch 21 and a carburetor switch 25 as described above. A kill switch 36 is connected through lines 37 and 38 across the ignition coil to short the coil when the kill switch is closed.

The carburetor switch 25 is a single pole double throw switch, movable between positions A and B as shown. When the carburetor piston is in the idle position the switch 25 is in position A, and supplies current from a power source 40 through coil A' of the latching relay 34 when the engine is running. When the coil A' of the latching relay is energized the kill switch 36 is maintained in the open position. When the carburetor switch 25 is in position B (corresponding to an open throttle condition) current from the power supply 40 is supplied to coil B' of the latching relay 34, causing the latching relay to close a switch 41 which energizes a bimetallic relay 39 which is operative to close the kill switch 36. Coil B' of latching relay 34 is connected in series with the throttle lever switch 21, and can only be energized when this switch is closed. Accordingly, the kill switch 36 can only be closed to short-circuit the engine ignition coil when the throttle lever switch actuator element 22 is released at least momentarily. Upon energization of coil B' of the latching relay 34, there is an adjustable time delay, nominally about one second, before the relay 39 closes the kill switch 36. If during that time the carburetor switch 25 returns to position A, latching relay coil A' is energized, resets the time delay relay 39, and the kill switch remains open. The functioning of the circuitry described above is set out in the following table.

or the throttle lever, the kill switch 36 will be closed to kill the engine at the end of the predetermined time delay. Even if the operator should replace his hand on the throttle lever at the end of the time delay, continued operation of the engine is impossible. The engine cannot be restarted until the latching relay is reset, and this can only occur through energization of coil A' through the switch 25. Coil A' can only be energized when the switch 25 is in position A, i.e. when the carburetor is in the idle condition, and accordingly the engine cannot be restarted with the throttle stuck open.

It will be understood that the details of the above described circuitry, e.g. the types of switches employed and their state (normally open or normally closed) are given only by way of example. With suitable wiring, the system can operate with switches which are normally open or normally closed. Furthermore, although with the breaker-point ignition system illustrated, the control system operates to short circuit the ignition coil, where the vehicle has condenser discharge ignition, the system will be arranged to open the primary ignition circuit. The essential point is that in a malfunction situation the control system acts to terminate or prevent operation of the engine.

LOGIC FUNCTION TABLE FIG. 4

| Vehicle Mode of operation | throttle lever position | throttle lever switch condition | carburetor position | carburetor switch condition | latching relay contacts | kill switch condition | engine ignition |
|---|---|---|---|---|---|---|---|
| 1. OFF/START | idle | close | idle | A | B'open | open | off but not killed |
| 2. IDLE | idle | close | idle | A | B'open | open | running |
| 3. Acceleration normal operation | acceleration normal oper. | open | acceleration normal oper. | B | B'open | open | running |
| 4. Slowing down (throttle lever released) | returning to idle | close | returning to idle | B to A | B'closed | open for 1 sec. | running for 1 sec. |
| 5. stuck throttle | stuck or loose | close | stuck or retained by throttle lever | B | B'closed | open to close 1 sec. | killed after 1 sec. |

The first vehicle mode labelled "off/start" is a normal condition of the vehicle prior to starting. The carburetor switch is in position A, but latching relay coil A' is not energized because there is no power supply.

Vehicle mode 2 indicates the normal idle condition of the engine. All systems are at idle, and the latching relay coil A' is energized.

Mode 3 represents the condition during normal operation or acceleration of the vehicle without malfunction. Carburetor switch 25 is now in position B. However latching relay coil B' is not energized since the throttle lever switch 21 is open.

Mode 4 represents conditions when the vehicle driver has released the throttle lever to slow the vehicle during normal operation. When the driver first releases the throttle lever, the throttle switch 21 closes, and coil B' of the latching relay 34 is energized since the throttle switch has not yet returned to position A. At this stage the time delay is activated so that unless the carburetor switch 25 is returned to position A (by movement of the piston 14 to the idle position) within one second, the kill switch will be closed by the relay 39. In normal operation, where no malfunction exists, the carburetor switch 25 will return to position A within the predetermined period, and thus the latching relay coil A' will be energized to reset the time delay and permit continued engine operation.

Figure 5:
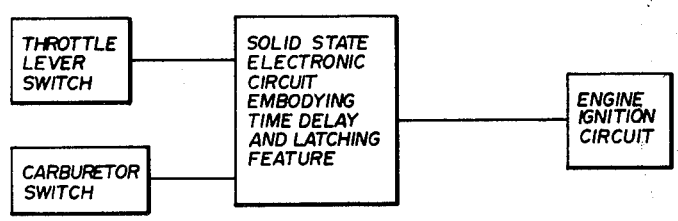
FIG. 5 is a block diagram of the system.

In mode 5 where a stuck throttle malfunction occurs, whether the malfunction is in the carburetor, the cable While the above description explains the broad principles of the control system, in practice solid state circuitry would be used in place of the discrete electromechanical components shown. FIG. 5 shows a schematic diagram of such an arrangement. In FIG. 5 the working principle of the system is exactly the same as previously described:-
- the throttle lever switch senses the position of the lever: idle or not;
- carburetor switch senses the position of the carburetor valve: idle or not;
- the electronic circuit compares both signals and sends the proper information to ignition kill device (which is embodied in electronic circuitry) according to the result of the comparison.

What is claimed as our invention is:
1. In a vehicle having an engine, a carburetor, a control element within said carburetor movable to adjust the quantity of fuel/air mixture supplied to said engine, a throttle/actuator situated remote from said engine and adapted to be engaged by a person operating the machine, means interconnecting said control element to move in response to movements of the actuator, said throttle actuator being movable from a limiting position, corresponding to an idle position of said control element wherein the quantity of air/fuel mixture supplied to the engine is sufficient to maintain operation of the engine at only an idle speed, to positions wherein progressively greater quantities of fuel/air mixture can be supplied to the engine, the improvement comprising: first sensing means responsive to engagement of said throttle actuator by the operator, and second sensing means directly responsive to the position of said carburetor control element, and engine control means associated with said first and second sensing means, said engine control means being effective to prevent starting of said engine when the throttle actuator is disengaged unless said carburetor control element is in said limiting position, and effective to terminate operation of said engine if said carburetor control element remains displaced from said limiting position when said throttle actuator is released, said first sensing means being a first switch responsive to the pressure of the operator's hand upon said throttle actuator irrespective of the position of said throttle actuator, said second sensing means comprising a second switch having a sensor positioned for engagement directly by the carburetor control element, said engine being of the spark ignition type and having an electrical ignition circuit which includes means for generating an ignition voltage, and said first and second switches being connected in series and being operative to prevent starting or terminating of operation of the engine by short-circuiting said voltage generating means.

2. The improvement according to claim 1 wherein said engine control means includes a time delay member operative to delay for a pre-determined time period termination of engine operation in response to release of the throttle actuator, such that if during said time period said carburetor control element returns to said limiting position the engine can continue to operate.

3. The improvement according to claim 1 further comprising resettable latching relay means connected in said ignition circuit and operative, upon termination of engine operation through actuation of said first or second switches, to prevent restarting of said engine until the latching relay means has been re-set.

4. The improvement according to claim 1 wherein said engine includes a plurality of said carburetors each having an associated second switch said second switches being connected in parallel.

5. The improvement according to claim 1 wherein a time delay member is operative to delay for a predetermined time period termination of engine operation in response to cessation of said engagement of the throttle actuator, such that if during said time period said carburetor control element returns to said limiting position the voltage generating means is not short-circuited and the engine can continue to operate.

* * * * *